US009539990B2

(12) United States Patent
Strengert et al.

(10) Patent No.: US 9,539,990 B2
(45) Date of Patent: Jan. 10, 2017

(54) CONTROL DEVICE FOR A VEHICLE BRAKE SYSTEM AND METHOD FOR OPERATING A VEHICLE BRAKE SYSTEM

(75) Inventors: Stefan Strengert, Stuttgart (DE); Michael Kunz, Steinheim an der Murr (DE)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 14/118,084

(22) PCT Filed: Mar. 19, 2012

(86) PCT No.: PCT/EP2012/054782
§ 371 (c)(1),
(2), (4) Date: Feb. 19, 2014

(87) PCT Pub. No.: WO2012/156123
PCT Pub. Date: Nov. 22, 2012

(65) Prior Publication Data
US 2014/0152082 A1    Jun. 5, 2014

(30) Foreign Application Priority Data

May 17, 2011    (DE) .......................... 10 2011 075 971

(51) Int. Cl.
*B60T 13/74*    (2006.01)
*B60T 8/17*    (2006.01)
(Continued)

(52) U.S. Cl.
CPC .. *B60T 8/17* (2013.01); *B60T 1/10* (2013.01); *B60T 7/042* (2013.01); *B60T 8/4872* (2013.01);
(Continued)

(58) Field of Classification Search
CPC .......... B60T 1/10; B60T 7/042; B60T 8/4872; B60T 13/146; B60T 13/662; B60T 13/686; B60T 13/586; B60T 8/17; B60T 2270/604; B60W 10/188; B60W 30/18127; B60W 2510/083; B60W 2710/182
(Continued)

(56) References Cited

U.S. PATENT DOCUMENTS 5,853,229 A    12/1998    Willmann et al.
5,882,093 A    3/1999    Enomoto et al.
(Continued)

FOREIGN PATENT DOCUMENTS

CN    1155261 A    7/1997
CN    1882463 A    12/2006
(Continued)

OTHER PUBLICATIONS

International Search Report issued in PCT/EP2012/054782, dated May 15, 2012.

*Primary Examiner* — Pamela Rodriguez
(74) *Attorney, Agent, or Firm* — Norton Rose Fulbright US LLP; Gerard Messina

(57) ABSTRACT

A control device for a brake system of a vehicle includes a valve control device, using which, while taking into account a provided information signal with respect to a currently exerted or to be exerted generator braking torque of a generator, at least one high-pressure switching valve of a brake circuit of the brake system is able to be controlled into an at least partially opened state such that a brake fluid volume is able to be displaced from a main brake cylinder of the brake system into a storage chamber of the brake circuit via the at least one high-pressure switching valve that has been controlled into the at least partially opened state. Furthermore, a method for operating a brake system of a vehicle is described.

13 Claims, 4 Drawing Sheets

(51) Int. Cl.
*B60T 1/10* (2006.01)
*B60T 7/04* (2006.01)
*B60T 8/48* (2006.01)
*B60T 13/14* (2006.01)
*B60T 13/66* (2006.01)
*B60T 13/68* (2006.01)
*B60T 13/58* (2006.01)
*B60W 10/188* (2012.01)
*B60W 30/18* (2012.01)

(52) U.S. Cl.
CPC ............ *B60T 13/146* (2013.01); *B60T 13/586* (2013.01); *B60T 13/662* (2013.01); *B60T 13/686* (2013.01); *B60T 2270/604* (2013.01); *B60W 10/188* (2013.01); *B60W 30/18127* (2013.01); *B60W 2510/083* (2013.01); *B60W 2710/182* (2013.01)

(58) Field of Classification Search
USPC ............... 303/3, 13, 14, 113.1, 113.4, 113.5, 114.1,303/114.3, 115.1, 115.2, 116.2, 119.1, 119.2,303/152; 188/156, 158, 159, 355–359; 180/65.1–65.8, 165; 701/70, 71, 82
See application file for complete search history.

(56) References Cited

U.S. PATENT DOCUMENTS

| | | | |
|---|---|---|---|
| 2001/0022254 A1* | 9/2001 | Hofmann | B60T 7/042 188/40 |
| 2013/0093237 A1* | 4/2013 | Dinkel | B60T 13/141 303/10 |
| 2013/0169032 A1* | 7/2013 | Linhoff | B60L 7/26 303/3 |

FOREIGN PATENT DOCUMENTS

| | | |
|---|---|---|
| DE | 19604134 | 8/1997 |
| DE | 19963760 | 7/2001 |
| JP | 10-14008 | 1/1998 |
| JP | H10-175535 A | 6/1998 |
| JP | 2001-63551 | 3/2001 |
| JP | 2002 255018 | 9/2002 |
| JP | 2002255081 A | 9/2002 |
| JP | 2006 137221 | 6/2006 |
| JP | 2007-276683 | 10/2007 |
| WO | WO 2011 134987 | 11/2011 |
| WO | WO 2011 160963 | 12/2011 |

* cited by examiner

CONTROL DEVICE FOR A VEHICLE BRAKE SYSTEM AND METHOD FOR OPERATING A VEHICLE BRAKE SYSTEM

CROSS REFERENCE TO RELATED APPLICATION

The present application is the national stage entry of International Patent Application No. PCT/EP2012/054782, filed on Mar. 19, 2012, which claims priority to Application No. DE 10 2011 075 971.9, filed in the Federal Republic of Germany on May 17, 2011.

FIELD OF INVENTION

The present invention relates to a control device for a vehicle brake system. Furthermore, the present invention relates to a method for operating a vehicle brake system.

BACKGROUND INFORMATION

German Patent Application No. DE 196 04 134 describes a method and a device for controlling a brake system of a motor vehicle having an electric drive. During the braking of the vehicle, while using the electric drive for simultaneously charging a battery, the hydraulic brake torque exerted upon at least one wheel by the at least one wheel brake caliper is supposed to be reduced/deactivated in spite of an operation of the brake pedal. In addition, by the operation of the brake pedal, the pressure medium displaced from the main brake cylinder to the wheel brakes is supposed to be counteracted, in that, by opening the outlet valves of the hydraulic brake system, the pressure medium displaced from the main brake cylinder is transferred via the at least one wheel brake caliper into at least one storage chamber. In this way, regenerative braking carried out by the electric drive is supposed to be blendable.

SUMMARY

The present invention provides a control device for a brake system for a vehicle and a method for operating a brake system of a vehicle.

The present invention enables the transferring of a brake fluid volume pressed out of the main brake cylinder in the storage chamber while bypassing the at least one wheel brake caliper. Thus, the transferring takes place without the building up of a residual pressure in the at least one wheel brake caliper, or rather, of a hydraulic "residual braking torque" at one wheel.

The brake system that is able to be implemented using the present invention may be circumscribed as a simple system broadened using a minimum changing effort. With that, it is possible to achieve a sufficient recuperative efficiency at minimum additional costs. The increase in the recuperative efficiency in the present invention is based mainly on the idea that the proposed brake system supports the driver in the modulation task in the case of a failed regenerative brake torque. The technology according to the present invention is in a position to react to a reduced recuperative braking torque of the recuperative brake, based, for example, on a full energy store and/or a vehicle speed below the minimum speed required for recuperative braking. In particular, this may be carried out without the braking distance being prolonged or the driver noticing a reaction in the operation of the brake operating element.

We point out that the ability to carry out the technology according to the present invention requires no free play developed on the brake operating element, the power brake unit or in the main brake cylinder. Consequently, the driver is able to brake quickly in the braking system, even at the fallback level.

One advantageous exemplary refinement has a brake operating element which is situated on the main brake cylinder such that, during the operating of the brake operating element using an operating force unequal to zero but below the minimum operating force, at which the driver braking force applied to the brake operating element is able to be transferred to the main brake cylinder piston, a force transfer between the brake operating element and the main brake cylinder piston is not present/is prevented. This enables a blending, during the non-presence/prevention of a force transfer between the brake operating element and the main brake cylinder piston. Consequently, the driver is not able to perceive a changed braking feel in response to a regenerative braking instead of an hydraulic braking. Based on the non-present/prevented force transfer between the main brake cylinder piston and the brake operating element, for instance, based on a missing mechanical coupling at an operating force below the minimum operating force, the counteracting force caused by the hydraulic pressure buildup is supported not on the brake operating element but only on the boost power of the brake booster. Consequently, the change in the counteracting force is not perceivable to the driver on the brake operating element. At the same time, in the present invention, the driver has the possibility to brake directly into the main brake cylinder, by operating the brake operating element using at least the minimum operating force. Thus, even in the case of a functional impairment of the brake booster, based, for example, on impairment of the power supply of the braking system, reliable braking of the vehicle is still assured.

One may also designate this as blending within the jump-in range (of the brake booster). The jump-in range represents an operating range of the brake booster, such as a vacuum booster, at which there exists no mechanical coupling between the brake operating element and the main brake cylinder piston. Nevertheless, braking into the main brake cylinder takes place already in the jump-in range. Consequently, the braking system has no free play and is able to be operated reliably particularly at the fallback level.

Using the technology according to the present invention, braking requirements may also be carried out without operating the brake operating element (active pressure build-ups).

Additional features and advantages of exemplary embodiments of the present invention are described below, with reference to the accompanying drawings.

DETAILED DESCRIPTION

Figure 1:
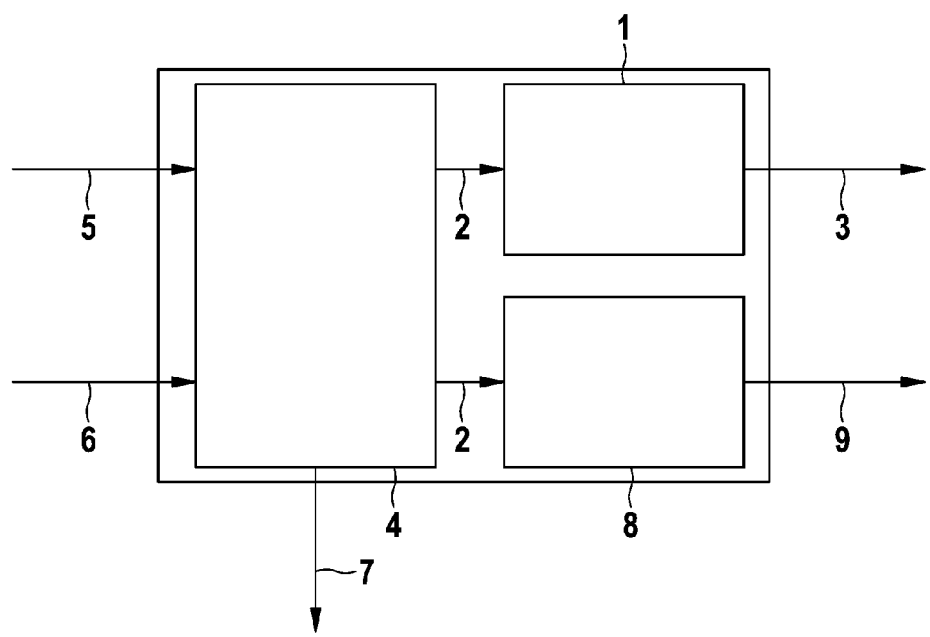
FIG. 1 shows a schematic representation of an exemplary embodiment of the control device.

FIG. 1 shows a schematic representation of an exemplary embodiment of the control device.

The control device reproduced schematically in FIG. 1 is usable in a vehicle brake system. The control device has a valve control device 1, using which at least one (not sketched) valve of a brake circuit of the brake system equipped with the control device is controllable, while taking into consideration (at least) one provided information signal 2 with respect to a currently exerted or to be exerted generator braking torque of a generator (not shown). In the process, using valve control device 1, a high-pressure switching valve is controllable as the at least one valve.

For example, using valve control device 1, the at least one information signal 2 may be comparable to a (not sketched) comparative signal with respect to a minimum generator braking torque. The comparative signal is particularly able to reproduce a minimum generator braking torque as of which blending of the generator braking torque, that is currently being exerted or to be exerted, is to be carried out. The comparative signal may correspond, for instance, to a minimum generator braking torque of a low value, such as particularly zero. Similarly, a temporal increase or decrease of the currently exerted, or to be exerted generator braking torque may be detectable via the comparison of information signal 2. The comparative signal may, for instance, be stored on an internal memory or information signal 2 may be continuously stored on an internal memory. Consequently, both a small generator braking torque, or a small increase over time in the generator braking torque is blendable using the control device in the manner described below.

The (at least one) information signal 2 is able to be provided, for example, by a vehicle bus, a generator control and/or a generator sensor to valve control device 1. A further advantageous possibility for providing information signal 2 to valve control device 1 will be described in greater detail below.

If information signal 2 is greater than the comparative signal, valve control device 1 is preferably designed to control the at least one (not sketched) valve, using a valve control signal 3, into an at least partially open state, such that a brake fluid volume is displaceable from a main brake cylinder of the brake system into a storage chamber of the brake circuit, via the at least one valve that was controlled to the at least partially opened state. In this context, using valve control device 1, a high-pressure switching valve of the brake circuit is able to be controlled, as the at least one valve, into the at least partially opened state such that the brake fluid volume is displaceable from the main brake cylinder into the storage chamber via the high-pressure switching valve that has been controlled into the at least partially opened state. Consequently, it is not necessary to displace the brake fluid volume pressed out of the main brake cylinder into the storage chamber via the at least one wheel brake caliper of the brake circuit, as will be discussed in greater detail below.

The brake fluid volume that is displaceable into the storage chamber via the high-pressure switching valve controlled into the at least partially opened state is able to correspond to the currently exerted or to be exerted generator braking torque. Consequently, particularly based on the displacement of the brake fluid volume into the storage chamber, the braking pressure of the brake circuit, using the controlled high-pressure switching valve, may be reduced such that a hydraulic brake torque of the at least one wheel brake caliper of the brake circuit is able to be reduced using the controlled high-pressure switching valve, and thus an increase over time of the current exerted, or to be exerted generator braking torque is at least partially able to be compensated for. The sum of the currently exerted, or to be exerted generator braking torque and of the hydraulic braking torque of the at least one wheel brake caliper preferably corresponds to a setpoint overall braking torque, specified by the driver and/or a vehicle speed control automatic system (such as ACC), although the generator braking torque varies/fluctuates with time. Below, we shall go into greater detail on the more accurate procedure for determining the brake fluid volume that is to be displaced into the storage chamber, and/or the temporal reduction of the hydraulic braking torque of the at least one wheel brake caliper. Valve control device 1 is preferably additionally designed to control the high-pressure switching valve, if information signal 2 lies below the comparative signal (or is equal to the comparative signal) into a closed state, such that a hydraulic connection between the main brake cylinder and the storage chamber is prevented by the high-pressure switching valve that has been controlled into the closed state. Consequently, the brake circuit operable using valve control device 1 is able to be controlled via control of the high-pressure switching valve into the at least partially opened state in a first mode, in which braking into the main brake cylinder without pressure buildup in the at least one wheel brake caliper of the brake circuit takes place, while the brake circuit is able to be controlled into a second mode via closing the high-pressure switching, in which braking into the main brake cylinder effects a hydraulic braking torque of the at least one wheel brake caliper of the brake circuit. As will be stated more accurately below, this may be used for an advantageous blending of the generator braking torque.

Furthermore, using valve control device 1, if information signal 2 lies above the comparative signal, at least one (not shown) wheel inlet valve of the brake circuit is able to be controlled to a closed state such that a hydraulic connection between the main brake cylinder and the at least one wheel brake caliper of the brake circuit is prevented by the at least one wheel inlet valve that has been controlled into the closed state. Consequently, it is preventable, in a simple manner, that, in spite of the controlling of the high-pressure switching valve into the at least partially opened state, the brake fluid volume pressed out of the main brake cylinder is displaced, at least to a small proportion, into the at least one wheel brake caliper. Correspondingly, the at least one wheel inlet valve is able to be controlled into an at least partially opened state, if information signal 2 lies below the comparative signal.

In one advantageous exemplary refinement, the control device is able to include a generator control device 4, by which the generator braking torque, that is to be exerted, may be established. The establishing of the generator braking torque to be exerted is able to take place while taking into account a first sensor signal 5 with respect to an operating force of operating a (not shown) brake operating element of the brake system and/or a second sensor signal and/or information signal 6 with respect to at least one executable optional generator braking torque. First sensor signal 5 may be provided, for instance, by a brake operating element sensor system, as will be described below. Second sensor signal and/or information signal 6 is advantageously provided by at least one sensor situated on the generator and/or on a battery that is chargeable by the generator and/or a vehicle bus, to generator control device 4. A generator control signal 7 that corresponds to the generator braking torque that is established as having to be exerted is subsequently able to be output to the generator. In the same way, information signal 2 may be output to valve control device 1 by generator control device 4.

Using generator control device 4, the generator braking torque to be exerted is advantageously able to be established while taking into account the second sensor signal and/or information signal 6 and a function of a variable deduced from the first sensor signal 5. In one particularly advantageous exemplary embodiment, a maximum of the function is close to a variable deduced from the first sensor signal 5 equal to a minimum operating force, as of which a driver braking force applied to the brake operating element is transferable to an adjustable main brake cylinder piston of the main brake cylinder.

The variable deduced from sensor signal 5 may be a braking distance, for example, a braking force and/or a braking pressure, or rather, at least one corresponding variable with respect to the operating force of the operation of the brake operating element. The function preferably states a preferred generator braking torque. A maximum of the function is preferably close to a variable deduced from the sensor signal equal to a minimum operating force, as of which a driver braking force applied to the brake operating element is transferable to an adjustable main brake cylinder piston of the main brake cylinder (not sketched).

At an operating force below the minimum operating force, when a force transfer between the adjustable main brake cylinder piston and the brake operating element is prevented/hindered/not ensured, the function/the preferred generator braking torque is thus able to increase steadily at increasing quantities. The preferred generator braking torque is particularly able to correspond to the operating force of the operating of the brake operating element/the driver braking command, at an operating force below the minimum operating force. By contrast, the function/the preferred generator braking torque does not have a curve proportional to the variable at an operating force above the minimum operating force. In a preferred manner, the function/the preferred generator braking torque decreases at an operating force above the minimum operating force.

In particular, the function/the preferred generator braking torque is able to tend to zero as of an operating force greater than the minimum operating force.

The control device is thus designed, for the recuperation of a generator braking torque, to utilize the prevented/hindered/not ensured force transfer between the adjustable main brake cylinder piston and the brake operating element. This ensures an advantageous operating convenience for the driver, in spite of the recuperation and the simultaneously executed blending, as will be described more accurately below.

Generator control device 4 may additionally be designed to establish the largest of the executable optional generator braking torques, which are even smaller or equal to the function of the variable deduced from first sensor signal 5 as the generator braking torque. Additional functions executable using generator control device 4 are described below.

In one additional advantageous exemplary refinement, the control device is able to include a pump control device 8, by which a pump (not shown) of the brake circuit is able to be actuated. Using the actuatable pump, a brake fluid is preferably able to be pumped from the storage chamber of the brake circuit to the at least one wheel brake caliper of the brake circuit. In this case, pump control device 8 is advantageously designed to control the pump, using pump control signal 9, from an inactive pump mode to an active pump mode, if the generator braking torque that is currently being executed or to be executed decreases over time. In this way, the hydraulic braking torque of the at least one wheel brake caliper is able to be increased so that the reduction over time of the generator braking torque is at least partially able to be compensated for. In a preferred way, the pump, using pump control device 8, is able to be actuated so that the sum of the generator braking torque and the hydraulic braking torque of the at least one wheel brake caliper remains (nearly) constant in spite of the decrease over time of the generator braking torque and/or corresponds to the setpoint overall braking torque.

Valve control device 1 may be integrated together with generator control device 4 and/or pump control device 8 into an evaluation electronics system. In this case, the necessity of supplying control devices 1, 4 and 8 separately with data to be evaluated drops out. However, the control device is not limited to the integration of control devices 1, 4 and 8 into one evaluation electronics system. The control device may particularly be designed to carry out the method steps of the methods described below. We shall therefore not go into greater detail at this point on the functioning of the control device.

Figure 2:
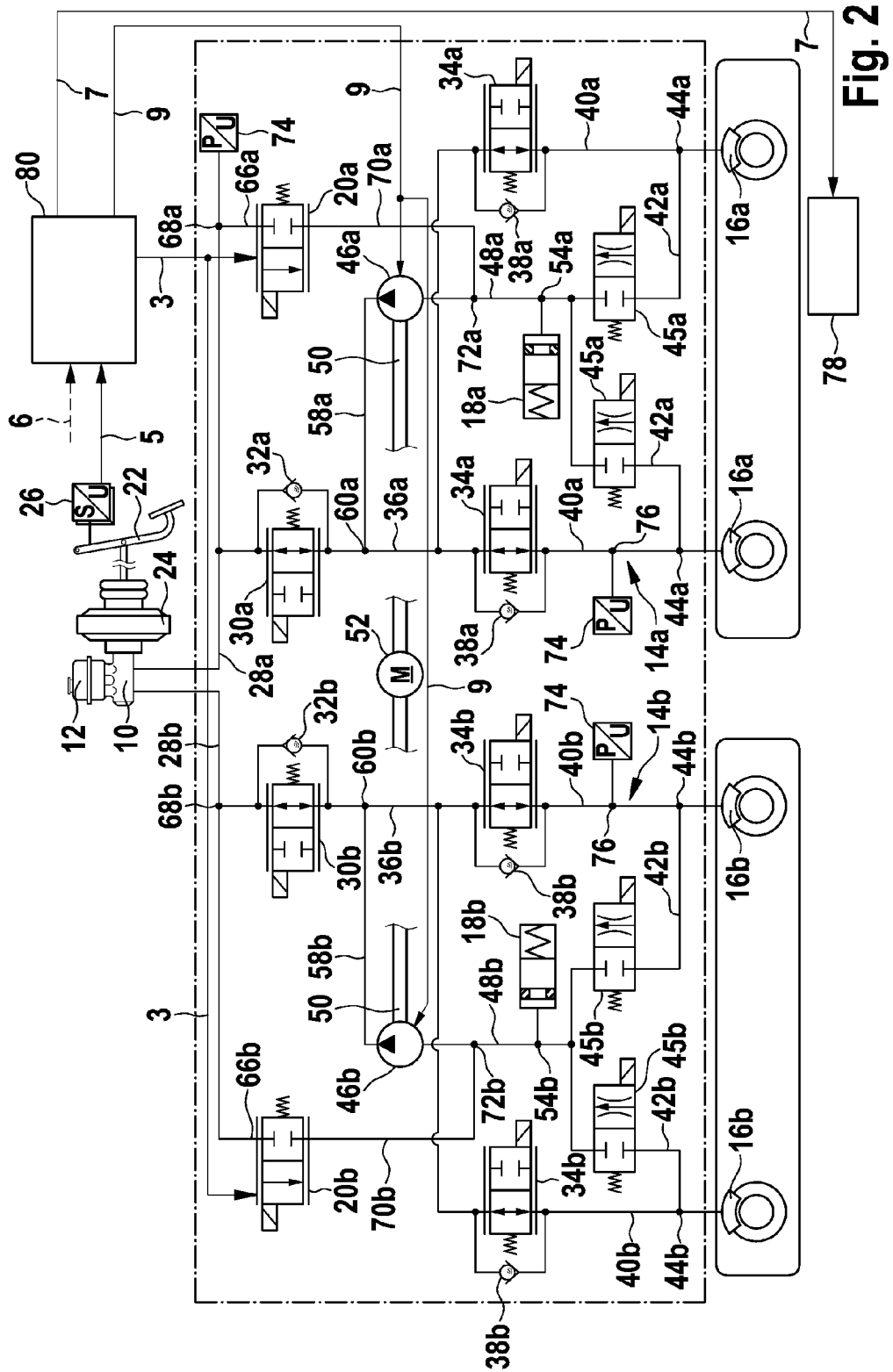
FIG. 2 shows a schematic representation of a braking system having a control device.

FIG. 2 shows a schematic representation of a braking system having the control device.

The brake system reproduced schematically in FIG. 2 is advantageously usable, for instance, in a hybrid vehicle and in an electric vehicle. The ability to substitute the brake system described further on is, however, not limited to its use in a hybrid vehicle or in an electric vehicle.

The brake system has a main brake cylinder 10, which is able to be executed as a tandem brake master cylinder, for example. However, the brake system is not limited to the use of a tandem brake master cylinder. Main brake cylinder 10 may be connected to a brake medium reservoir 12 via at least one brake fluid exchange opening such as a snifting bore, for example.

At least one brake circuit 14a and 14b is hydraulically connected to main brake cylinder 10. The at least one brake circuit 14a and 14b includes at least one wheel brake caliper 16a and 16b, one storage chamber 18a and 18b and one high-pressure switching valve 20a and 20b. In one preferred exemplary embodiment, the at least one brake circuit 14a and 14b includes at least one regulatable/continuously controllable high-pressure switching valve 20a and 20b. The at least one storage chamber 18a and 18b is preferably developed as a low-pressure storage chamber.

The wheels assigned to brake circuit 14a or 14b may be situated diagonally on a vehicle. In this case, the brake system is designed for an X brake circuit subdivision, to which it is not limited, however. The brake system may also be used for a II-brake circuit subdivision, for example, in which the wheels assigned to a brake circuit 14a and 14b are situated on a common axle.

The brake system preferably also has a brake operating element 22, such as a brake pedal. The subdivision is advantageously situated on main brake cylinder 10 such that, upon operating brake operating element 22 using at least a minimum operating force, a driver brake force applied to brake operating element 22 at a minimum operating force is able to be transmitted to an adjustable main brake cylinder piston of main brake cylinder 10 such that the main brake cylinder piston is adjustable using the driver braking force. Preferably, using this adjustment of the main brake cylinder piston, an inner pressure in at least one chamber of main brake cylinder 10 is increased. In the brake system described here, brake operating element 22 is additionally situated on main brake cylinder 10 such that, during the operation of the brake operating element, using an operating force unequal to zero but below the minimum operating force of a force transmission between brake operating element 22 and the main brake cylinder piston is prevented. This ensures the advantage that, during the operation of brake operating element 22 using the operating force below the minimum operating force of main brake cylinder 10 and the at least one brake circuit 14*a* and 14*b* linked to it is "decoupled", and consequently the driver perceives no reaction of the pressure present in it. We shall take up in greater detail below the advantageous replaceability of this advantage for blending a brake torque. However, the brake system is not limited to such a situation of brake operating element 22 on main brake cylinder 10.

In one preferred exemplary embodiment, the brake system shown also has a brake booster 24, such as a vacuum brake booster. Instead of a vacuum brake booster, the brake system may also have another type of brake booster 24, such as an hydraulic and/or an electromechanical boosting device. Brake booster 24 may particularly be a continuously regulatable/continuously controllable brake booster.

Using brake booster 24, as a rule, at least during the operation of brake operating element 22 below the minimum operating force, the main brake cylinder piston is adjustable such that a brake fluid volume is displaceable from main brake cylinder 10. Based on the advantageous functioning manner of the at least one high-pressure switching valve 20*a* and 20*b*, the brake fluid volume displaced from the main brake cylinder is optionally displaceable into storage chamber 18*a* and 18*b* or into the at least one wheel brake caliper 16*a* and 16*b*.

At the beginning of a pedal travel, as a rule, a brake booster 24 has infinite boosting. In this range, there is not yet any mechanical coupling between brake operating element 22, such as a brake pedal, and the main brake cylinder piston. One may also designate this as a lack of mechanical coupling between brake operating element 22 and the brake system. The driver brake force is in this range not drawn upon for operating main brake cylinder 10, that is, for adjusting the main brake cylinder piston, but only for controlling brake booster 24.

The beginning of the pedal travel, in which the operating force unequal to zero is still below the minimum operation, is therefore frequently also named the jump-in range. Outside of the jump-in range, mechanical coupling exists between brake operating element 22 and the main brake cylinder piston. The driver brake force is consequently utilized outside the jump-in range to adjust the main brake cylinder piston, and thus for braking into the at least one wheel brake caliper 16*a* and 16*b*. This process is able to be supported by the additional force of brake booster 24.

The property of brake booster 24 is thus able to be utilized for braking in the main brake cylinder without mechanical coupling/force transmission between brake operating element 22 and the main brake cylinder piston. Consequently, the beginning of the pedal travel having an operating force unequal to zero but less than minimum operation, or rather the jump-in range, is advantageously usable for blending a generator braking torque, as will be shown below.

The brake system preferably also includes a brake operating element sensor 26 using which the operating force of the operation of operating element 22 is ascertainable by the driver. Brake operating element sensor 26 may include, for instance, a pedal travel sensor, a differential travel sensor and/or a rod position sensor. In order to record the operating force that corresponds to the driver's intent, however, a different type of sensor system may also be used instead of, or in addition to the sensor types enumerated here.

Besides that, the brake system may have additional free play, which is able to be developed either on brake operating element 22, such as a brake pedal, on brake booster 24 and/or on main brake cylinder 10. Since the technology according to the present invention does not require such free play in the brake system, we shall not go into it further at this place.

In one exemplary embodiment shown, the brake system has two brake circuits 14*a* and 14*b*, which are developed identically. However, the ability to develop the brake system is not limited to this number of brake circuits 14*a* and 14*b*, nor to the same development of its brake circuits 14*a* and 14*b*. In particular, the following statements on brake circuits 14*a* and 14*b* should be understood to be only exemplary:

Each of the brake circuits 14*a* and 14*b* has two wheel brake calipers 16*a* and 16*b*, which are together assigned to a storage chamber 18*a* and 18*b*. Brake circuits 14*a* and 14*b* are connected via a supply line 28*a* and 28*b*, which leads to a brake circuit-specific switchover valve 30*a* or 30*b* having a check valve 32*a* or 32*b* situated in parallel with it, to main brake cylinder 10. The two wheel inlet valves 34*a* and 34*b* that are each assigned to a wheel brake caliper 16*a* or 16*b* are connected to switchover valve 30*a* or 30*b* via a branching line 36*a* or 36*b*. In each case, one check valve 38*a* or 38*b* is situated in parallel to each of wheel inlet valves 34*a* and 34*b*. Wheel inlet valves 34*a* and 34*b* are connected via a line 40*a* or 40*b* to the associated wheel brake caliper 16*a* or 16*b*. Via a line 42*a* or 42*b* and a branching point 44*a* or 44*b* that is developed in lines 40*a* and 40*b*, respectively one wheel outlet valve 45*a* and 45*b* is connected to the associated wheel brake caliper 16*a* or 16*b*.

Each of brake circuits 14*a* and 14*b* has a pump 46*a* or 46*b*, which is connected to the two wheel outlet valves 45*a* and 45*b* of the respective brake circuit 14*a* and 14*b*, via a branching line 48*a* or 48*b*. Pumps 46*a* or 46*b* may be designed as one-piston pumps, for example. Instead of such a pump type, however, differently designed modulation systems which include, for instance, at least one pump having a plurality of pistons, at least one asymmetrical pump and/or at least one gear pump, may also be used. In particular, pumps 46*a* and 46*b* may be situated on a common shaft 50 of a pump motor 52.

The storage chamber 18*a* and 18*b* described above may be connected to line 48*a* and 48*b* via respectively one branching point 54*a* or 54*b*. We should point out that preferably no check valve is situated in line 48*a* and 48*b*. This is what implements the advantageous transferability of a brake fluid volume from main brake cylinder 10 into storage chamber 18*a* or 8*b*, while bypassing wheel brake caliper 16*a* and 16*b*.

While the inlet side of pump 46*a* and 46*b* is connected to wheel outlet valves 45*a* and 45*b* and storage chamber 18*a* and 18*b*, the pressure side may be connected to switchover valve 30*a* or 30*b* and wheel inlet valves 34*a* and 34*b* of the associated brake circuits 14*a* and 14*b*, using an additional line 58*a* and 58*b* and a branching point 60*a* or 60*b* developed in line 36*a* and 36*b*.

High-pressure switching valves 20*a* and 20*b*, which are able to be used so advantageously for blending a generator-brake torque are connected via a line 66*a* or 66*b* and a branching point 68*a* or 68*b*, that is developed in supply line 58*a* and 58*b*, to main brake cylinder 10. In addition, each high-pressure switching valve 20*a* and 20*b* is hydraulically connected via a line 70*a* and 70*b* to a branching point 72*a* and 72*b* to the components linked thereto. Furthermore, at least one brake circuit 14*a* or 14*b* may have a pressure sensor 74, which is connected, for instance, to line 40*a* and 40*b* or to a supply line 28*a* via a branching point 76.

The brake system also has a generator 78 and control device 80 described above, which receives signals 5 and 6 from brake operating element-sensor 26, generator 78, a battery (not sketched) and/or a bus system, and which outputs control signals 3, 7 and 9 to generator 78, high-pressure switching valves 20a and 20b and/or pumps 46a or 46b. Reference is made to the statements above regarding the method of functioning of control device 80.

As a result, using the brake system in the previous paragraphs, the advantages already mentioned earlier are also able to be implemented.

Figure 3:
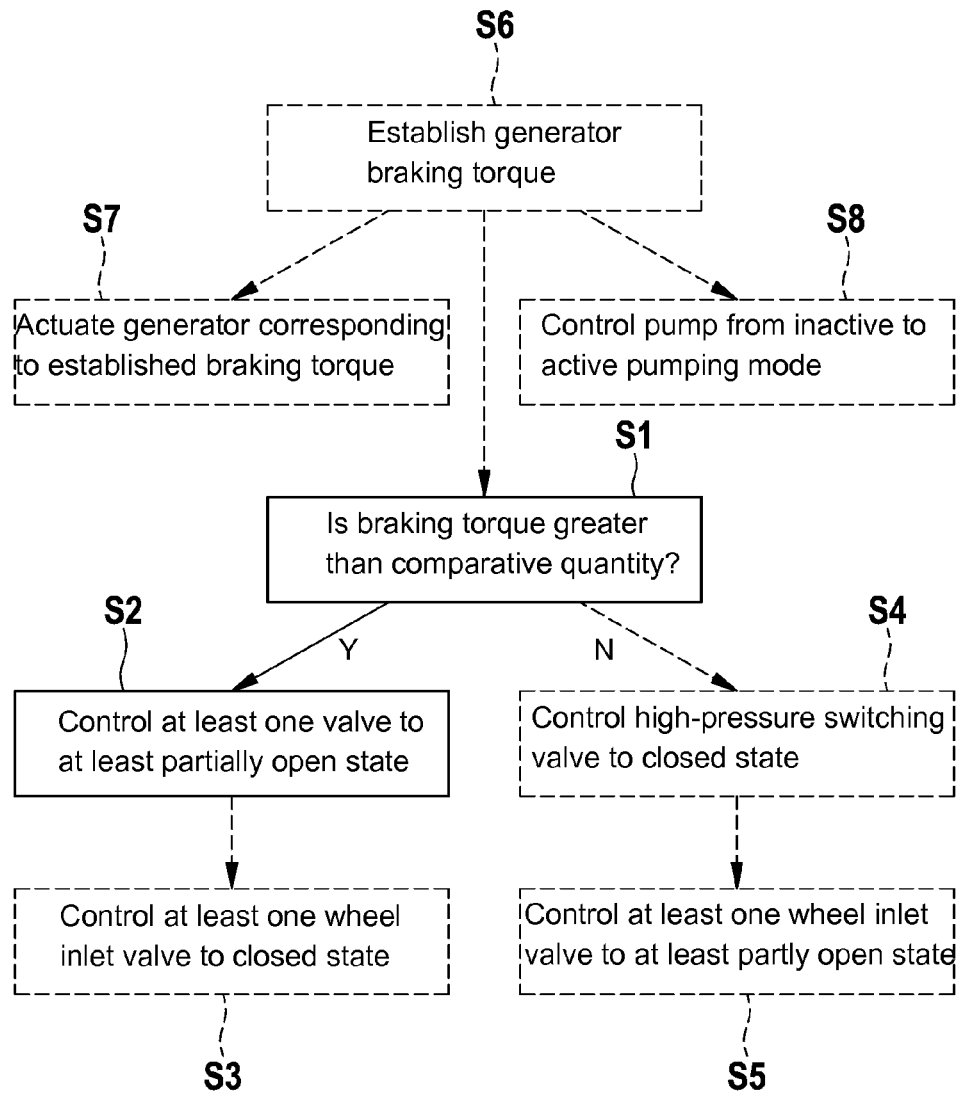
FIG. 3 is a flow chart showing a first exemplary embodiment of the method.

FIG. 3 shows a flow chart to show a first exemplary embodiment of the method. The method that will be described below may be able to be implemented at least partially using the control device already described above. The ability to implement the method is not, however, limited to the use of the control device or the brake system described above. In a method step S1, a braking torque variable with respect to a currently exerted, or to be exerted generator braking torque of a generator is compared to a comparative quantity with respect to a minimum generator braking torque. Examples for the comparative quantity for comparing the braking torque variable were mentioned above. The compared braking torque variable may be provided, for instance, by a sensor for measuring the generator braking torque and/or by a vehicle and/or a vehicle-specific control device for actuating the generator. Below, we shall go into an especially advantageous manner for providing the braking torque variable.

In a method step S2, provided the braking torque variable is greater than the comparative variable, for instance, because the braking torque variable increases over time, at least one valve of a brake circuit of the brake system is controlled to an at least partially open state. This takes place such that a brake fluid volume pressed out of the main brake cylinder of the brake system is displaced into a storage chamber of the brake circuit via the at least one valve controlled into the at least partially open state. In this context, at least one high-pressure switching valve of the brake circuit is controlled as the at least one valve into the at least partially open state. Consequently, it may be achieved that the braking fluid volume pressed out of the main brake cylinder is displaced into the storage chamber via the high-pressure switching valve that was controlled into the at least partially open state. In this way, the hydraulic braking torque of the at least one wheel brake caliper of the brake circuit is able to be held constant or reduced, in spite of the displacing of the brake fluid from the main brake cylinder to the brake circuit. In spite of the operation of the brake operating element by the driver and the pressure buildup connected with it in the main brake cylinder, no (undesired) hydraulic braking torque is therefore built up.

Using the method, it may be ensured that a hydraulic braking torque of at least one wheel brake caliper is adjusted to an exertable and currently exerted generator braking torque of a generator that an overall braking torque specified by the driver is reliably maintained.

Provided the braking torque variable is greater than the comparative variable, in an optimal manner, together with method step S2, a method step S3 is also carried out. In method step S3, at least one wheel inlet valve of the brake circuit is controlled to a closed state such that a hydraulic connection between the main brake cylinder and the at least one wheel brake caliper of the brake circuit is prevented by the at least one wheel inlet valve that has been controlled into the closed state. Consequently, in a simple way, a slight filling of the at least one wheel brake caliper is also prevented based on the increased pressure in the main brake cylinder.

Provided the braking torque variable is less than the comparative variable, a method step S4 may be carried out. In method step S4, the high-pressure switching valve of the brake circuit is controlled to the closed state. In this way, a hydraulic connection between the main brake cylinder and the at least one storage chamber is able to be reliably prevented, whereby a brake fluid displacement from a main brake cylinder of the brake system into at least one wheel brake caliper of the brake circuit is effected/ensured.

Thus, using the brake operating element, such as using a brake pedal, the driver brakes into the at least one wheel brake caliper via the main brake cylinder. To reinforce the braking effect of the driver, a brake booster may additionally be used. The behavior of the brake system controlled by the method thus corresponds, during method step S4, to a (conventional) brake system without a blending function being carried out.

In a preferred manner, a method step S5 is also carried out with method step 4, in which the at least one wheel inlet valve is controlled to at least one partially open state. Consequently, using the main brake cylinder, braking is able to take place into at least one wheel brake caliper.

In one advantageous exemplary refinement, the method also includes a method step S6. In method step S6, the generator braking torque of the generator that is to be exerted is established. This takes place while taking into account an operating force variable of an operating force of the operation of a brake operating element of the brake system and/or of a generator information with respect to at least one optional generator braking torque that is able to be carried out. In this context, it is preferably ensured that the largest generator braking torque that is able to be carried out for braking the vehicle is carried out, in order to charge a battery that is chargeable using the generator within a comparatively short time.

A regenerative braking is, as a rule, only able to be carried out if the battery able to be charged using the generator has a charging value below a threshold value, and/or the vehicle is traveling at a speed above a specified minimum speed. Consequently, during the generative braking, an established/known/easily measurable generator braking torque is acting on the vehicle, which frequently, however, cannot be held constant over time, based on the factors named above. In spite of the varying/ceasing of the generator braking torque, it is desirable that the overall braking torque specified by the driver be reliably maintained. This may advantageously be implemented using the method just described.

In a preferred manner, in method step S6, a current operating force variable is compared to a previously recorded/ascertained operating variable. Provided an increased operating variable is detected, the increased operating variable is compared to a threshold value with respect to a minimum operating force. The minimum operating force corresponds to an operating force as of which a driver braking force applied to the brake operating element is transferred on an adjustable main brake cylinder piston. Provided the increased operating force variable exceeds the threshold value, the generator braking torque is held constant or reduced, however, in spite of the increased operating force variable.

In method step S6, provided the increased operating force variable is (still) less than the threshold value, an increased generator braking torque is preferably ascertained while taking into account the increased operating force variable.

Subsequently, the largest of the optional generator braking torques that is able to be carried out, which are still less than, or equal to the increased generator braking torque, is established as the generator braking torque that is to be carried out. (Provided no optional generator braking torque that is able to be carried out is ascertainable, which is less than, or equal to the increased generator braking torque, the generator braking torque that is to be carried out is established equal to zero. In the case of the method, since recuperative braking having a high fixed generator braking torque is carried out mainly at an operating force below the minimum operating force, based on the prevented force transmission between the brake operating element and the main brake cylinder, no force reaction/counteracting force is transferred to the brake operating element. Consequently, in spite of a purely hydraulic braking, the driver senses no counteracting force on the brake operating element, as when a mechanical coupling is present between the brake operating element and the main brake cylinder. In the same way, in the case of purely generative braking, the driver senses no lack of the counteracting force, since, at an operating force below the minimum operating force, he is used to sensing no counteracting force conditioned on at least one wheel brake caliper. In a method step S7 following method step S6, the generator is actuated corresponding to the established generator braking torque that is to be carried out.

Optionally, the method may also have a method step S8. In method step S8, provided the generator braking torque currently being carried out or to be carried out decreases over time, a pump of the brake circuit is controlled from an inactive pumping mode to an active pumping mode. Using the pump of the brake circuit, a brake fluid is able to be pumped from the storage chamber of the brake circuit to the at least one wheel brake caliper of the brake circuit. Consequently, the hydraulic braking torque of the at least one wheel brake caliper is able to be increased using the activation of the pump. In this way, the decrease over time of the generator braking torque is able to be partially compensated for.

Figure 4:
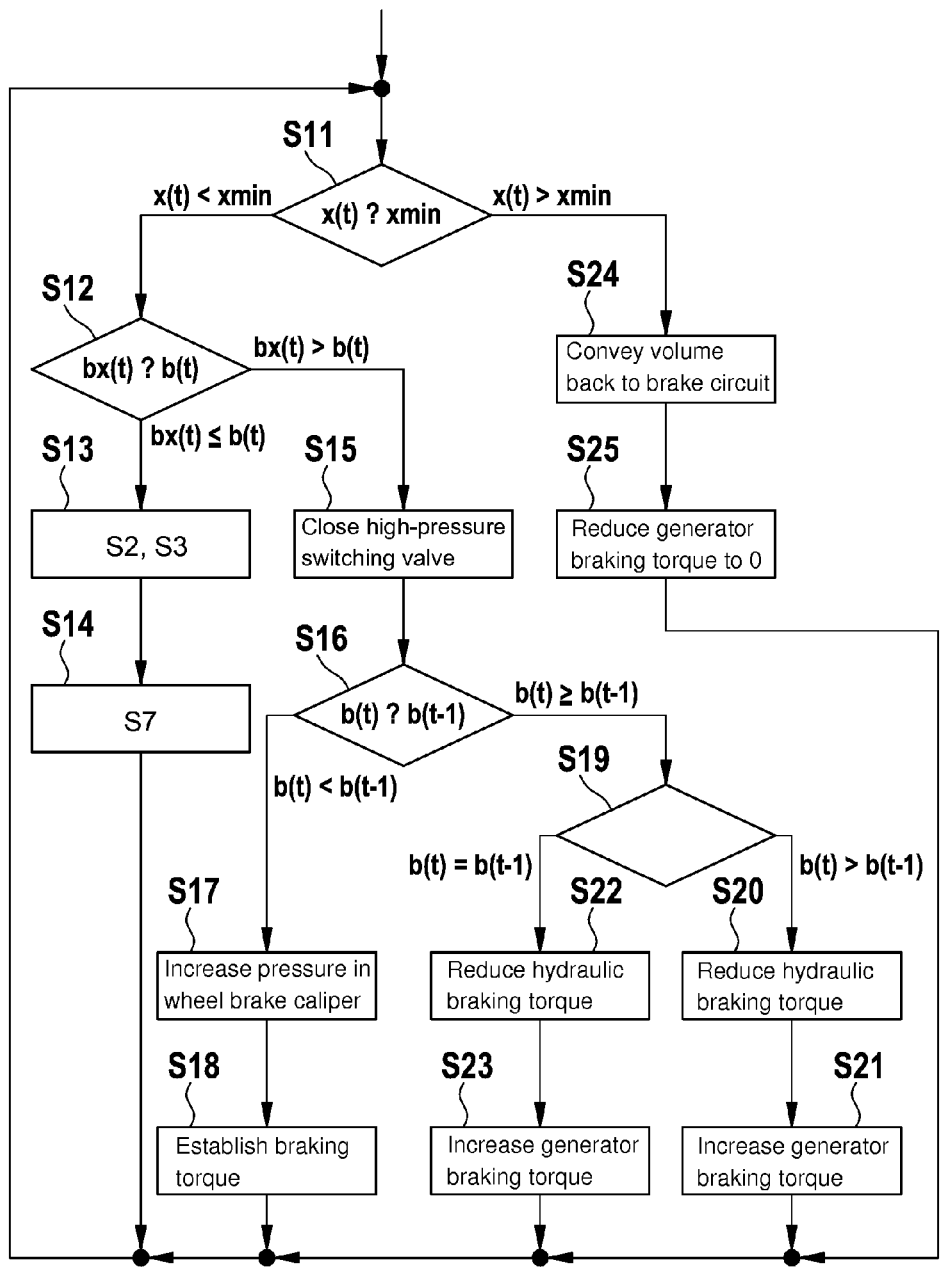
FIG. 4 is a flow chart showing a second exemplary embodiment of the method.

FIG. 4 shows a flow chart to demonstrate a second exemplary embodiment of the method.

The ability to be carried out of the method described below is not limited to the use of the abovementioned control device, or rather the brake system equipped with it, although the method is able to be carried out at least partially with it.

In a method step S11, a sensor signal received with respect to an operating force $x(t)$ of an operation of the brake operating element by the driver is compared to a threshold value with respect to a minimum operating force xmin, in the case of operating the brake operating element at an operating force $x(t)$ below minimum operating force xmin a force transfer between the brake operating element and an adjustable main brake cylinder piston of a main brake cylinder being prevented. In contrast, in the case of operating the brake operating element using at least the minimum operating force xmin, a driver brake force applied to the brake operating element is transferred to the adjustable main brake cylinder piston such that the latter is adjustable using the driver brake force, and thus an inner pressure in at least one chamber of the main brake cylinder is able to be increased. The minimum operating force may correspond, for instance, to a total brake torque of 0.2 g. Provided operating force $x(t)$ corresponding to the sensor signal is less than minimum operating force xmin corresponding to the threshold value, or rather, provided the sensor signal is less than the threshold value, in a method step S12 the sensor signal is compared to an information signal with respect to at least one optional generator braking torque $b(t)$ that is able to be carried out. In this context, it is investigated, for example, whether a generator braking torque $bx(t)$ corresponding to the operating force is currently able to be carried out using the generator. If this is so, method step S13 (method step S2) is subsequently carried out.

In method step S13, the high-pressure switching valve of the at least one brake circuit of the brake system is controlled to an at least partially opened state. In method step S13, preferably the at least one wheel inlet valve of the brake circuit equipped with the actuated high-pressure switching valve is also closed (method step S3). Thus, the operation of the brake operating element has the effect of displacing brake fluid from the main brake cylinder into the storage chamber of the at least one brake circuit using the actuated high-pressure switching valve.

Consequently, it is ensured that in spite of the operation of the brake operating element and the adjustment connected with it of the main brake cylinder piston, no hydraulic braking torque is exerted on a wheel of the vehicle using the at least one wheel brake caliper. Because of that, the overall braking torque required by the driver is completely usable for charging the battery via regenerative braking. Since, at an operating force $x(t)$ below minimum operation xmin, there is no force transfer between the brake operating element and the main brake cylinder piston, the driver does not sense that the brake fluid volume displaced from the main brake cylinder is displaced into the storage chamber, and not into the at least one wheel brake caliper.

One may also circumscribe this such that, within a jump-in range defined by minimum operation xmin, there exists no mechanical coupling between the brake operating element and the main brake cylinder piston, and thus, based on the fundamental missing of the pedal counteracting force in the jump-in range, the driver cannot determine into which component the brake fluid volume is being displaced. Consequently, the driver does not sense from the pedal counteracting force whether the braking is hydraulic or regenerative.

In method step S14 carried out subsequently (method step S7), the generator is actuated so that the actual braking torque of the generator corresponds to the established generator braking torque to be carried out, particularly the requested overall braking torque. This assures the rapid charging of the battery. In method step S12, if it is determined that one is only able to decelerate purely hydraulically (for instance, because one is not able to take the generator into operation), then, in a method step not shown, the high-pressure switching valve of the at least one brake circuit is closed. Thus, brake fluid is able to be displaced from the main brake cylinder into the at least one wheel brake caliper, while a brake fluid displacement from the main brake cylinder into the storage chamber is prevented. This assures a purely hydraulic braking of the vehicle that is able to be reliably carried out. For this purpose, the at least one wheel inlet valve is preferably controlled into an least partially opened state.

If operating force $x(t)$ is still below minimum operating force xmin, although a braking torque $bx(t)$ corresponding to operating force $x(t)$ is greater than the (maximum) executable generator braking torque $b(t)$, braking may be done both regeneratively and hydraulically. To do this, in a method step S15, a hydraulic setpoint braking torque equal to the difference of braking torque $bx(t)$ (corresponding to braking force $x(t)$ and currently executable (maximum) generator braking element $b(t)$ may be built up.

For this purpose, preferably as of an overall braking torque (driver braking command) above the (maximum) executable generator braking torque b(t), the high-pressure switching valve is closed. In this way, a braking torque bx(t) corresponding to the difference between operating force x(t) and the volume corresponding to the (maximum) executable generator braking torque b(t) are displaceable into the at least one wheel brake caliper. Consequently, corresponding to the raising of the driver's command, additionally to the generator braking torque, a hydraulic braking torque may additionally be built up via a pressure buildup in the at least one wheel brake caliper. The sum of the generator braking torque and the hydraulic braking torque preferably corresponds to the driver's command/operating force x(t).

Thus, at an operating force x(t) below minimum operating force xmin, or rather, at a driver's command within the jump-in range, braking may be done optionally purely hydraulically, hydraulically and regeneratively (method step S15), or purely regeneratively (method step S13). If the generator braking torque currently able to be executed (regenerative braking torque) permits a purely regenerative braking, then by the opening of the high-pressure switching valve it is ensured that the volume displaced by the driver from the main brake cylinder is displaced into the storage chamber, and with that, no hydraulic braking torque is built up. As of a driver command above the maximum executable generator braking torque, at least a part of the vehicle deceleration is able to be effected via the at least one wheel brake caliper.

In the case of a blending of the generator braking torque, which at least partially satisfies the driver's command, the brake fluid volume displaced by the driver from the main brake cylinder may be displaced directly into the storage chambers based on doing without a check valve. Thus no pressure buildup is created in the brake system equipped with the storage chamber, whereby no hydraulic braking torque is built up. Based on the closed inlet valves, it may be assured in addition that actually no hydraulic residual torque is built up in the wheel brake cylinders, since no volume is able to be displaced into the at least one wheel brake caliper, or no volume is displaced via the at least one wheel brake caliper into the storage chamber.

As long as a force transmission between the brake operating element and the main brake cylinder piston is prevented at an operating force x(t) below minimum operation xmin, the driver is not able to sense, with the aid of the counteracting force on the brake operating element, where the volume displaced by him from the main brake cylinder is transferred to. Thus, the driver notices no difference between the carrying out of method step S15 and the carrying out of method step S13. Nevertheless, the driver command is able to be ascertained using a brake operating element sensor system situated on the brake operating element, and the vehicle deceleration is able to be set reliably, accordingly.

After method step S15, it is tested in a method step S16 whether the (maximum) executable generator braking torque decreases (over time) (b(t)<b(t−1)). If this is determined, the high-pressure switching valve is/remains closed. Subsequently, in a method step S17, using the at least one pump, volume from the at least one storage chamber may be conveyed to the at least one associated wheel brake caliper. In this way, the brake pressure in the at least one wheel brake caliper is increased, which leads to an increase in the hydraulic braking torque. The volume conveyed using the pump preferably corresponds to the decrease (over time) of the generator braking torque, that is able to be executed. In a method step S18 carried out before, at the same time or after, the (maximum) executable generator braking torque is established as the generator braking torque that is to be carried out. (The generator is actuated accordingly).

Provided that, in method step S17, the entire volume previously displaced into the storage chamber is conveyed back again into at least one brake circuit, braking is subsequently done purely hydraulically. Based on the prevented force transmission between the brake operating element 22 and the main brake cylinder piston, this is not perceivable by the driver.

In a decrease over time of the maximum executable generator braking torque during one braking, the high-pressure switching valve of the at least one brake circuit is closed, the at least one wheel inlet valve of the actuated brake circuit being preferably also opened. The pressure increase effected by the pumping is measurable, for example, by a main brake cylinder pressure sensor. In this way, regulation of the pump rotational speed may be carried out. To increase the pressure regulating accuracy, in addition to the pump, the constantly regulatable high-pressure switching valve may also be used for setting the desired hydraulic braking torque. In this way too, it may be reliably implemented that the sum of the generator braking torque and the hydraulic braking torque corresponds to the driver's command. Because of the missing mechanical coupling/the prevented force transmission between the main brake cylinder and the brake operating element, the pumping process is also not perceivable in a tactile manner by the driver when operating the brake operating element.

If it is determined in a method step S19 that the generator braking torque that is able to be carried out increases during the braking (b(t)>b(t−1)), the generator braking torque that is to be carried out is able to be held constant, nevertheless, in an optional method step that is not shown. At the same time, it may be assured via an appropriate actuation of the high-pressure switching valve that a reduction or increase in operating force x(t) during a braking being currently carried out leads only to a change in the hydraulic braking torque. This applies until an operating force x(t) above minimum operating force xmin (i.e., leaving the jump-in range) or an operating force x(t) corresponding to the generator braking torque being currently carried out is determined. This braking strategy has the advantage of maximum comfort. The driver is able to determine neither a change in the pedal travel/pedal force characteristics nor a change in the pedal travel/deceleration characteristics.

Alternatively to the method steps of the preceding paragraph, the high-pressure switching valve may also be actuated such that the hydraulic braking torque adjusts itself to an increase or a decrease in operating force x(t) of the operation of the brake operating element by the driver (not sketched). Thereafter the generator may be actuated such that the generator braking torque carried out is raised corresponding to the increase in the generator braking torque that is able to be carried out (not shown). This is also possible without the driver specifying a change in his braking command. Too great a deceleration could possibly lead to the driver releasing the pedal, whereby the hydraulic braking torque is automatically reduced. This leads to a perceivable change in the pedal travel/deceleration characteristics, but maximizes the energy gained via the recuperation during braking.

As an additional (preferred) step, a reduction in the hydraulic braking torque (method step S20) and a simultaneous increase in the generator braking torque (method step S21) may also be carried out. In the process, the volume displaced during the combined regeneratively and hydraulically carried out braking may be let out in the brake circuit using the at least one continuously regulatable high-pressure switching valve into the storage chambers. By this possibility of the specific and regulated reduction in the hydraulic braking torque, the generator braking torque is able to be increased in an adapted manner. This operating strategy has the advantage of maximum operating comfort of the brake operating element at a simultaneous recuperation of the maximum possible kinetic energy for charging the battery that is chargeable using the generator.

Corresponding combinations of the method steps named above may also be carried out if the generator braking torque remains constant during braking (b(t)=b(t−1)), as is reflected by method steps S22 and S23.

If it is determined during the execution of method step S11 that operating force x(t) is/is becoming greater than minimum operating force xmin, or that the driver command is leaving the jump-in range, the high-pressure switching valve is/remains closed. In a method step S24, the volume displaced into the at least one storage chamber is able to be conveyed back, using the pump, into the at least one brake circuit.

In a further method step S25, the generator braking torque to be carried out is able to be reduced to zero and the generator may be actuated accordingly. At the end of method steps S24 and S25, the brake system is able to carry out a purely hydraulic braking. This procedure does not lead to a change in the pedal travel/pedal force and in the pedal travel/deceleration characteristics. It is not perceivable by the driver and is therefore not connected to a forfeit of comfort.

As an alternative to method step S24, it is also conceivable, after determining the exceeding of the minimum operating force xmin by operating force x(t), or after leaving the jump-in range, not to reduce the generator braking torque, that is to be carried out, all the way to zero. For example, the generator braking torque to be carried out may instead be further specified corresponding to the main brake cylinder pressure, and the generator actuated accordingly. In this way, the recuperative efficiency of the brake system is able to be raised, since regenerative braking is also carried out outside the jump-in range, and the battery is thus charged more quickly. The changed pedal travel/deceleration characteristics coming about thereby is perceivable by the driver, to be sure, but tends to be perceived positively by him, since, in response to strong braking, he also senses a reaction of the brake system that is perceivable in a tactile manner.

By carrying out the method, it is possible to set the hydraulic braking torque of at least one wheel brake caliper of the brake system such that, in spite of the varying over time of generator braking torque b(t) that is to be carried out, the braking command specified by the driver is reliably maintained during recuperation. If the generator braking torque b(t), that is maximally able to be carried out, is sufficient for a complete implementation of the driver command, braking may be performed regeneratively, whereby the battery is quickly chargeable.

If the driver command is greater than the maximum executable generator braking torque b(t), a hydraulic braking torque may be built up in addition to the generator braking torque. This preferably takes place so that the driver command is completely satisfied. Likewise, in a situation in which no generator braking torque is able to be carried out by the generator, braking may be done purely hydraulically.

In the brake system described above, or rather, in a brake system operated using the method described here, partially active braking requirements, i.e., pressure buildups using the pump, are able to be carried out, based on the omission of the check valve, using a changed procedure. If the driver has already displaced volume into the brake circuit, and has thus generated a corresponding hydraulic brake pressure, the continuously regulatable high-pressure switching valve may be opened using a Delta-P regulation such that a limited volume is shifted via the opened high-pressure switching valve into the associated storage chamber, without the hydraulic pressure in the brake circuit being significantly reduced thereby. The pedal reactions thus produced are comparable to those of conventional brake systems at partially active braking requirements. The volume displaced into the storage chamber may subsequently be conveyed into the brake circuit using the pump, in order thus to support the driver in his braking requirement.

What is claimed is:

1. A brake system for a vehicle, comprising:
    a master brake cylinder;
    a brake circuit with two wheel brake calipers, two wheel outlet valves, an accumulator chamber, a high-pressure switching valve, and a pump, wherein an intake side of the pump is hydraulically connected via a first branching line to the two wheel output valves, and the high-pressure switching valve is hydraulically connected via a second line to a branching point which is formed in the first line;
    a control device for a brake system of a vehicle, comprising:
        a valve control device adapted to control, while taking into account a provided information signal relating to a currently carried out or to be carried out generator braking torque of a generator, the high-pressure switching valve into an at least partially opened state such that a brake fluid volume is shifted from the master brake cylinder into the accumulator chamber via the at least one high-pressure switching valve that has been controlled into the at least partially opened state;
    wherein the accumulator chamber is a low-pressure accumulator chamber which is connected to the first line, the first line being without a check valve, and the low-pressure accumulator chamber being connected to the first line in such a way that the brake fluid volume is transferred into the low-pressure accumulator chamber by bypassing the two wheel brake calipers.

2. The brake system according to claim 1, wherein, provided the information signal is less than a comparative signal relating to a minimum generator braking torque, the high-pressure switching valve is controllable into a closed state using the valve control device such that a hydraulic connection between the master brake cylinder and the accumulator chamber is prevented by the high-pressure switching valve that has been controlled into the closed state.

3. The brake system according to claim 2, wherein, provided the information signal is greater than the comparative signal, at least one wheel inlet valve of the brake circuit is controllable into a closed state such that a hydraulic connection between the master brake cylinder and at least one wheel brake caliper of the brake circuit is prevented by the at least one wheel inlet valve controlled into the closed state.

4. The brake system according to claim 1, wherein the control device further comprises:
    a generator control device adapted to establish the generator braking torque of the generator to be exerted while taking into account a first sensor signal relating to an operating force of an operation of a brake operating element of the brake system and/or of a second sensor signal and/or information signal with respect to at least one optional generator braking torque that is able to be carried out, and adapted to output to the generator a generator control signal corresponding to the established generator braking torque that is to be exerted.

5. The brake system according to claim 4, wherein the generator control device is adapted to establish the generator braking torque to be carried out, while taking into account the second sensor signal and/or information signal and a function of a variable derived from the first sensor signal, a maximum of the function being close to a variable derived from the first sensor signal equal to a minimum operating force, as of which a driver braking force applied to the brake operating element is able to be transmitted to an adjustable master brake cylinder piston of the master brake cylinder.

6. The brake system according to claim 1, wherein the control device further comprises:
a pump control device adapted to control, provided the currently exerted or to be exerted generator braking torque decreases over time, the pump of the brake circuit, which is adapted to pump the brake fluid from the accumulator chamber of the brake circuit to at least one wheel brake caliper of the brake circuit, from an inactive pumping mode to an active pumping mode.

7. The brake system according to claim 1, wherein the high-pressure switching valve is a continuously regulatable high-pressure switching valve.

8. A method for operating a brake system of a vehicle, the brake system a master brake cylinder and a brake circuit with two wheel brake calipers, two wheel outlet valves, an accumulator chamber, a high-pressure switching valve and a pump, wherein an intake side of the pump is hydraulically connected via a first branching line to the two wheel outlet valves, and the high-pressure switching valve, and the high-pressure switching valve is hydraulically connected via a second line to a branching point which is formed in the first line, the method comprising:
comparing a braking torque variable relating to a currently exerted or to be exerted generator braking torque of a generator to a comparative variable relating to a least generator braking torque;
provided the braking torque variable is greater than the comparative variable, controlling the high-pressure switching valve into an at least partially opened state such that a brake fluid volume is able to be displaced from the master brake cylinder into the accumulator chamber via the high-pressure switching valve that has been controlled into the at least partially opened state; and
transferring the brake fluid volume through the first line, which is without a check valve, into the accumulator chamber, by bypassing the two wheel brake calipers, the accumulator chamber being embodied as a low-pressure accumulator chamber.

9. The method according to claim 8, further comprising:
provided the braking torque variable is greater than the comparative variable, controlling at least one wheel inlet valve of the brake circuit into a closed state such that a hydraulic connection between the master brake cylinder and at least one of the wheel brake calipers of the brake circuit, by the at least one wheel inlet valve controlled into the closed state, is prevented.

10. The method according to claim 8, further comprising:
establishing the generator braking torque of the generator that is to be exerted while taking into account an operating force variable relating to an operating force of an operation of a brake operating element of the brake system and/or a generator information with respect to at least one optional braking torque that is able to be exerted; and
actuating the generator corresponding to the established generator braking torque that is to be exerted.

11. The method according to claim 10, further comprising:
provided an increased operating force variable is detected, comparing the increased operating force variable to a threshold value relating to a least operating force as of which a driver braking force applied to the brake operating element is transmitted to an adjustable master brake cylinder piston of the master brake cylinder; and
provided the increased operating force variable exceeds the threshold value, holding constant or reducing the generator braking torque to be exerted in spite of the increased operating force variable.

12. The method according to claim 8, further comprising:
provided the currently exerted or to be exerted generator braking torque decreases over time, controlling a pump of the brake circuit, which is adapted to pump the brake fluid from the accumulator chamber of the brake circuit to at least one of the wheel brake calipers of the brake circuit, from an inactive pumping mode to an active pumping mode.

13. The brake system as recited in claim 8, wherein the brake circuit includes only one accumulator chamber.

* * * * *